UNITED STATES PATENT OFFICE.

EDWARD C. BRICE, OF COLWYN, PENNSYLVANIA.

PROCESS OF PRODUCING BUILDING MATERIAL.

SPECIFICATION forming part of Letters Patent No. 669,977, dated March 19, 1901.

Application filed May 11, 1900. Serial No. 16,365. (No specimens.)

*To all whom it may concern:*

Be it known that I, EDWARD C. BRICE, a citizen of the United States, residing at Colwyn, in the county of Delaware and State of Pennsylvania, have invented certain new and useful Improvements in Processes of Producing Building Material, of which the following is a full, clear, and exact description.

My invention is based upon the discovery that if certain material of the general nature of that hereinafter described be heated to a temperature sufficiently high to partially fuse the same and when in that condition it be subjected to considerable pressure while in yielding or plastic condition and then properly annealed said material will in its qualities and appearance closely resemble natural stone and will be strong, solid, tenacious, and practically non-porous.

The exact nature of the invention will clearly appear from the following description.

In practicing the invention I take, for example, a quantity of fusible clay or shale or such as contains a fusible substance or substances, which I first shape or mold into a coherent mass or "clot" of desired form and dimensions, preferably approximately that of the block or brick to be finally made. This mass or clot I subject in a suitable furnace to a temperature to bring the same to a bright-red heat—that is, sufficient to partially fuse the mass to a plastic or dough-like condition. This expels the moisture, but leaves the material in an open or porous condition. While the clot is in this more or less yielding or plastic condition I place the same in a mold adapted to give to the clot the required final form and subject it (the clot) to considerable pressure in order to close up the pores, and thus to solidify the mass. This pressure will usually be such as to reduce the volume of the mass or clot from, say, thirty to fifty per cent. During the latter operation the outer surface of the mass rapidly cools and hardens sufficiently to permit handling of the block by tongs or the like. I finally introduce the block into a suitable furnace and anneal the same, whereby strength and tenacity are imparted to the material. When the block has sufficiently cooled, it is ready for use.

The exact composition of the material is not essential in carrying out my invention. For example, although most shales or clays contain a sufficient quantity of fusible substances for the purpose of my invention, there may, if necessary, be mixed with the natural clay or shale glass and lime or analogous substances to give suitable fusibility and coherence or bond to the mass. A great variety of material may be used in the carrying out of my invention. It is only essential that such material shall be a refractory or comparatively refractory mineral earth, base, or composition containing or having combined therewith a mineral substance capable of being partially fused at a high temperature into a plastic condition to form what may be termed a "bond" for the mass. For further example, the material may be composed of a proper admixture of sand, lime, and some fusible material, such as glass or slag. I have successfully used ninety-three parts of clean sand, combined with seven parts of a mixture composed of two parts of glass or slag and one part of milk of lime. Again, I have used a composition consisting of a mixture of about ninety-three parts of sand containing clay and seven parts of glass or slag, lime not being required when clay is present. The foregoing proportions are by weight.

By the introduction into the material before fusing of a suitable coloring substance a desired color may be given to the block.

I further remark that bricks made in accordance with my invention are especially adapted for pavements, sewers, &c., where strength, tenacity, and non-absorbent quality are particularly desirable.

I remark that while it is essential in order to produce complete or best results that the compressed clot shall be subjected to the annealing process there may be occasions wherein the brick or block may be useful without having been annealed.

Having thus described my invention, I claim as new and desire to secure by Letters Patent—

1. The hereinbefore-described process of producing artificial building material, consisting in subjecting comparatively-refractory mineral earth, containing a mineral fusible material, to heat sufficient to partially fuse the same into plastic form, and while in such plastic form subjecting the mass to compression to solidify the same into a compact homogeneous brick, or block, and finally annealing said brick or block, substantially as set forth.

2. The process of producing artificial building material consisting in subjecting comparatively-refractory mineral earth, containing a mineral fusible material, to heat sufficient to partially fuse the same into plastic form and while in that form solidifying the mass by pressure, substantially as set forth.

In testimony whereof I have hereunto affixed my signature this 5th day of May, A. D. 1900.

EDWARD C. BRICE.

Witnesses:
  WM. D. YARNALL,
  WALTER C. PUSEY.